United States Patent
Linde et al.

(10) Patent No.: US 9,111,243 B2
(45) Date of Patent: Aug. 18, 2015

(54) GLOBAL PROCESS TEMPLATE AND ADAPTATION OF GLOBAL PROCESS TO LOCAL COUNTRY TO FACILITATE MIGRATION TO SHARED SERVICE CENTER

(75) Inventors: Stefan Arien Linde, Hamburg (DE); Till Lohmann, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 2104 days.

(21) Appl. No.: 11/263,137

(22) Filed: Oct. 27, 2005

(65) Prior Publication Data

US 2007/0100646 A1   May 3, 2007

(51) Int. Cl.
G06Q 10/00 (2012.01)
G06Q 10/06 (2012.01)
G06Q 10/10 (2012.01)

(52) U.S. Cl.
CPC ............ *G06Q 10/063* (2013.01); *G06Q 10/067* (2013.01); *G06Q 10/10* (2013.01)

(58) Field of Classification Search
USPC .............................................. 705/7.12, 7.13
See application file for complete search history.

(56) References Cited

U.S. PATENT DOCUMENTS

| | | | |
|---|---|---|---|
| 6,256,773 B1 * | 7/2001 | Bowman-Amuah | 717/121 |
| 6,721,713 B1 * | 4/2004 | Guheen et al. | 705/1 |
| 6,954,736 B2 * | 10/2005 | Menninger et al. | 705/28 |
| 7,069,234 B1 * | 6/2006 | Cornelius et al. | 705/80 |
| 7,814,142 B2 * | 10/2010 | Mamou et al. | 709/203 |
| 2003/0191661 A1 * | 10/2003 | Doyle et al. | 705/1 |
| 2004/0128186 A1 * | 7/2004 | Breslin et al. | 705/10 |
| 2005/0027696 A1 * | 2/2005 | Swaminathan et al. | 707/3 |
| 2005/0216507 A1 * | 9/2005 | Wright | 707/104.1 |

* cited by examiner

*Primary Examiner* — Thomas Mansfield
(74) *Attorney, Agent, or Firm* — Yudell Isidore Ng Russell PLLC; John Pivnichny

(57) ABSTRACT

A method, apparatus and computer-usable medium for creating a Global Process Template (GPT) that describes standardized aspects of a business process used by clients of multiple Shared Service Centers (SSCs), wherein the GPT defines uniform business processes, core business processes, and local business processes.

20 Claims, 15 Drawing Sheets

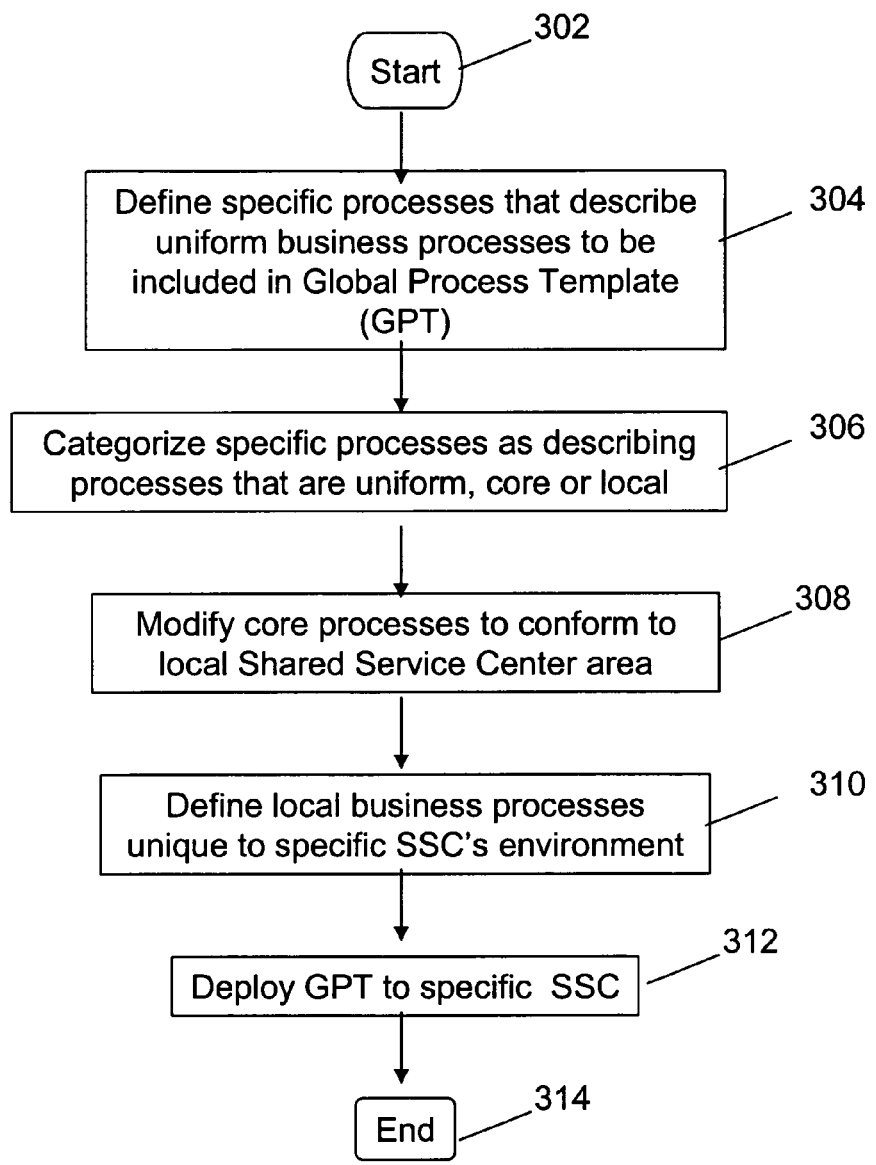

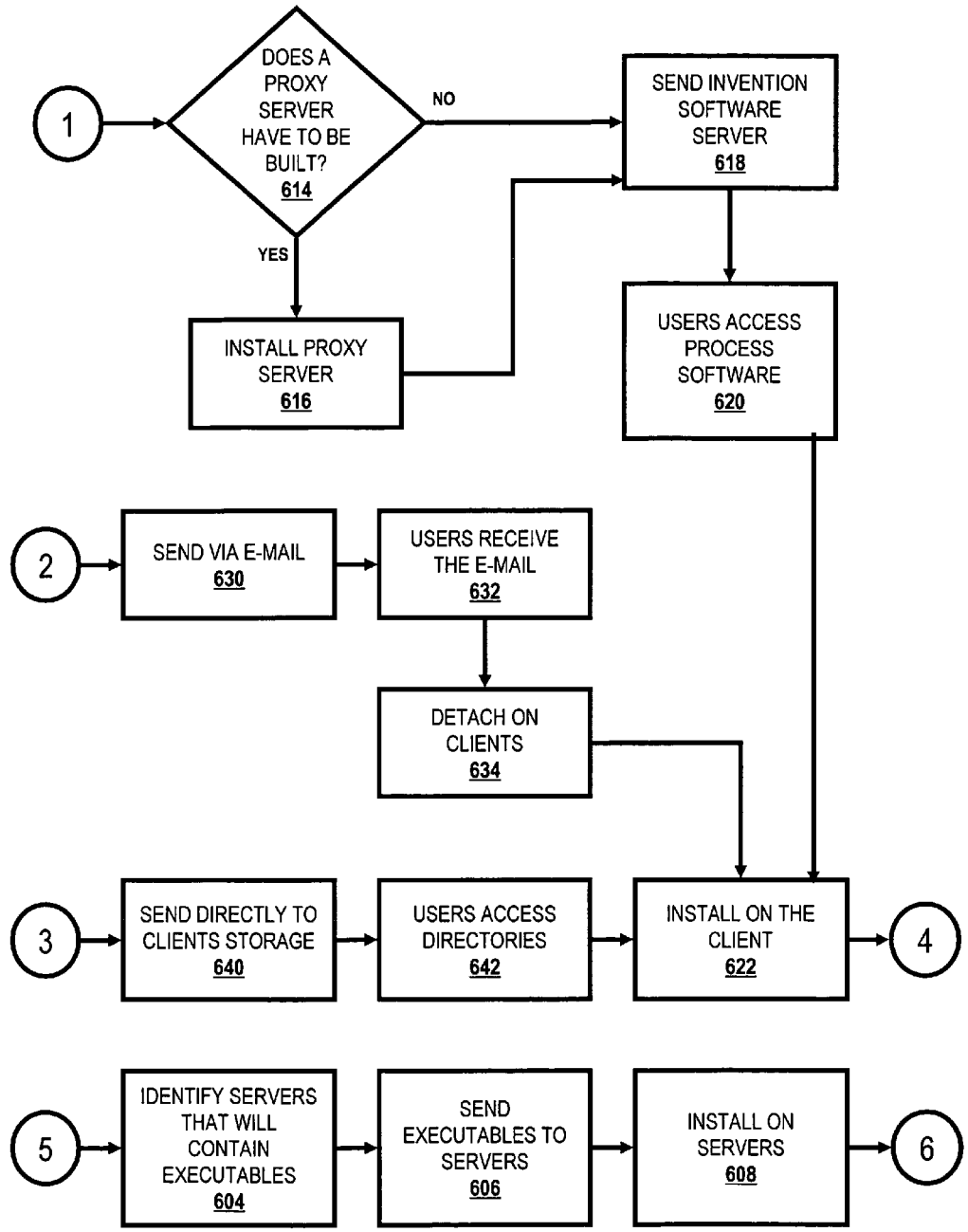

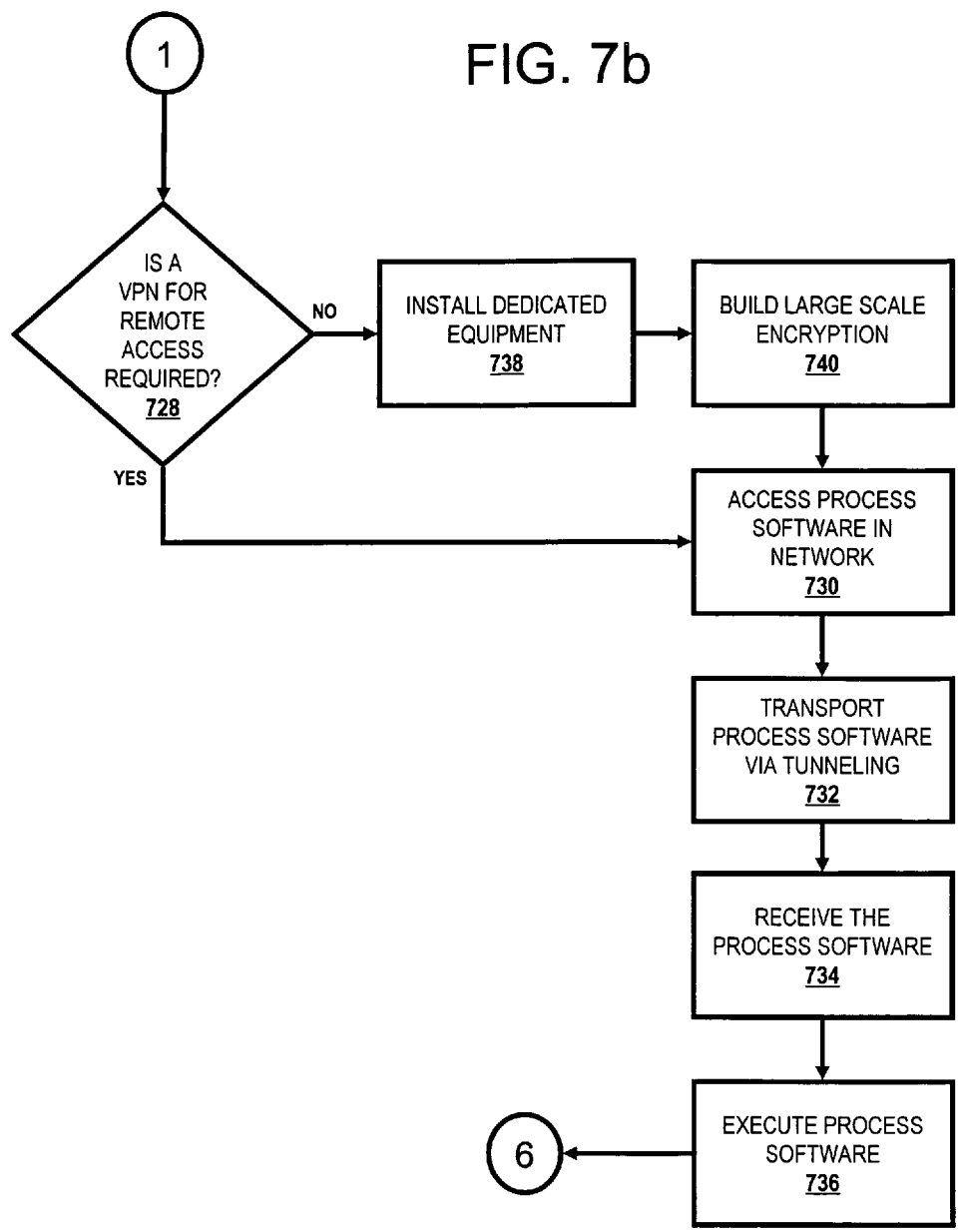

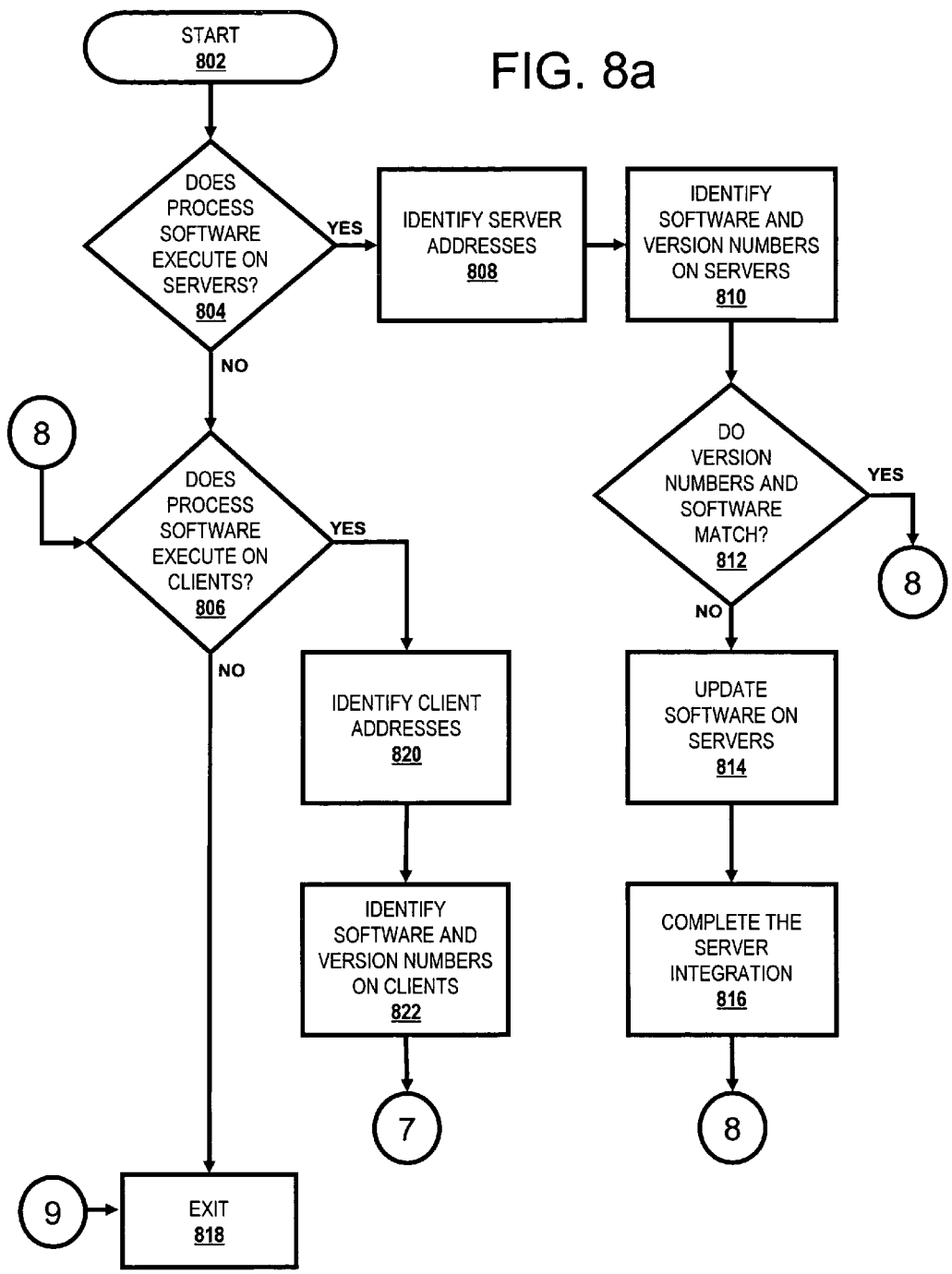

GLOBAL PROCESS TEMPLATE AND ADAPTATION OF GLOBAL PROCESS TO LOCAL COUNTRY TO FACILITATE MIGRATION TO SHARED SERVICE CENTER

BACKGROUND OF THE INVENTION

1. Technical Field

The present invention relates in general to the field of computers and similar technology systems, and in particular to software utilized by such systems to implement methods and processes. Still more particularly, the present invention relates to a method and system for creating and implementing a standardized template describing business processes.

2. Description of the Related Art

Business Transformation Outsourcing (BTO) occurs when a client organization engages a vendor (outsourcer) who will perform a set of business processes on the client's behalf. Oftentimes, the outsourcer often takes over all or some of the employees executing these processes at the client's location.

An exemplary arrangement is illustrated in FIG. 1, showing a BTO arrangement among Shared Service Centers (SSCs) 102 and clients 104. Note that each SSC 102 may service multiple clients 104 (such as SSC 102a and clients 104a-b), or a single client 102 may be serviced by multiple SSCs 104 (such as client 104b and SSCs 102a-b), or a client 104 may be serviced by only a single SSC 106 (such as client 104n and SSC 102n).

The use of an SSC enables the client to focus on its core business while gaining the benefits of lower cost, higher quality and speedier implementation of business processes offered by the outsourcer. These benefits often depend, however, on the outsourcer's ability to transform the client's business processes from highly customized to highly standardized versions.

BTO vendors (outsourcers) typically service multiple clients 104 from one or more SSCs 102, thus producing economy of scale. Thus, BTO vendors typically have a network of SSCs 102 to ensure their geographic reach covers all the client's requirements, such as spoken languages and legal/regulatory requirements.

Typically, BTO vendors attempt to rationalize business processes on multiple sites or countries in different regions for one client 104 into a single set of common processes. However, since each of the sites or countries 104 usually has different procedures followed in a same process, the results quickly become confusing. That is, each SSC 102 operated by the BTO vendor will quickly begin to have different departments or specifically allocated staff for each site, until a single SSC 102 starts to look like as many different companies are there are sites or countries, since each site or country will require SSC personnel who are trained to follow the unique business processes of each that site or country.

SUMMARY OF THE INVENTION

To address the need described above for an improved method and system for standardizing business processes handled by an SSC, the present invention includes, but is not limited to, a method, apparatus and computer-usable medium for creating a Global Process Template (GPT) that describes standardized aspects of a business process used by clients of multiple Shared Service Centers (SSCs), wherein the GPT defines uniform business processes, core business processes, and local business processes.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2b illustrates sub-processes and activities associated with a process in the GPT shown in FIG. 2a;

FIG. 3 is a flow-chart of exemplary steps taken to create and deploy the GPT to clients;

FIGS. 6a-b show a flow-chart of steps taken to deploy software capable of executing the steps shown and described in FIGS. 2-3;

FIGS. 7a-c show a flow-chart of steps taken to deploy in a Virtual Private Network (VPN) software that is capable of executing the steps shown and described in FIGS. 2-3;

FIGS. 8a-b show a flow-chart showing steps taken to integrate into a computer system software that is capable of executing the steps shown and described in FIGS. 2-3.

DETAILED DESCRIPTION OF THE PREFERRED EMBODIMENT

A method, apparatus and computer-usable medium is presented for a Global Process Template (GPT), which is used in creating and adopting standard business processes in the context of Business Transformation Outsourcing (BTO). Once created, the GPT is deployed across multiple Shared Service Centers (SSCs), which may be in different geographic, cultural and/or legal environments. In addition, the method can be used during the initial set-up of a particular regional SSC.

Figure 2A:
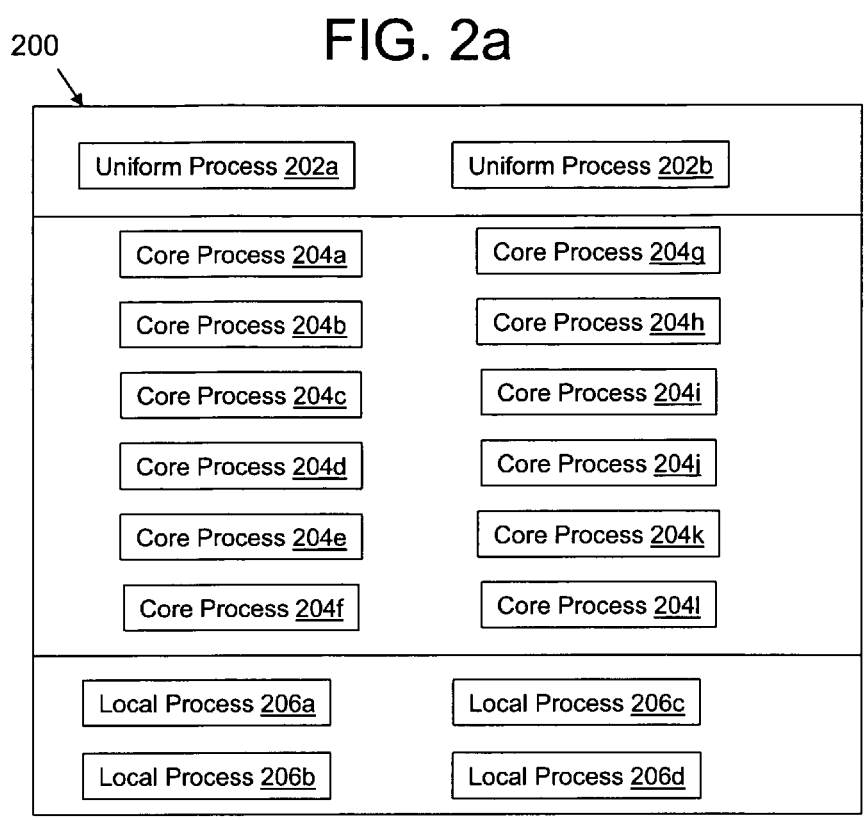
FIG. 2a depicts uniform, core and local processes identified in a Global Process Template (GPT)

Referring now to FIG. 2a, there is depicted a Global Process Template (GPT) 200, which is partitioned into uniform processes 202, core processes 204, and local processes 206. Preferably, uniform processes account for about 10% of the total business processes described by GPT 200, while core processes 204 account for a majority (preferably about 60%) of the processes, while local processes 206 account for the remaining 30% of the processes described in GPT 200.

Figure 1:
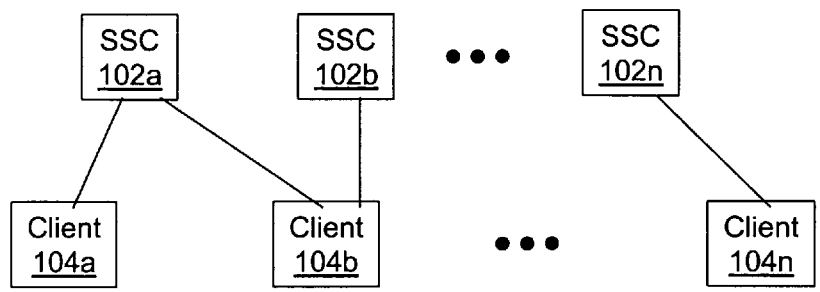
FIG. 1 illustrates a prior art system of Shared Service Centers (SSCs) providing service to one or more clients.
Figure 2B:
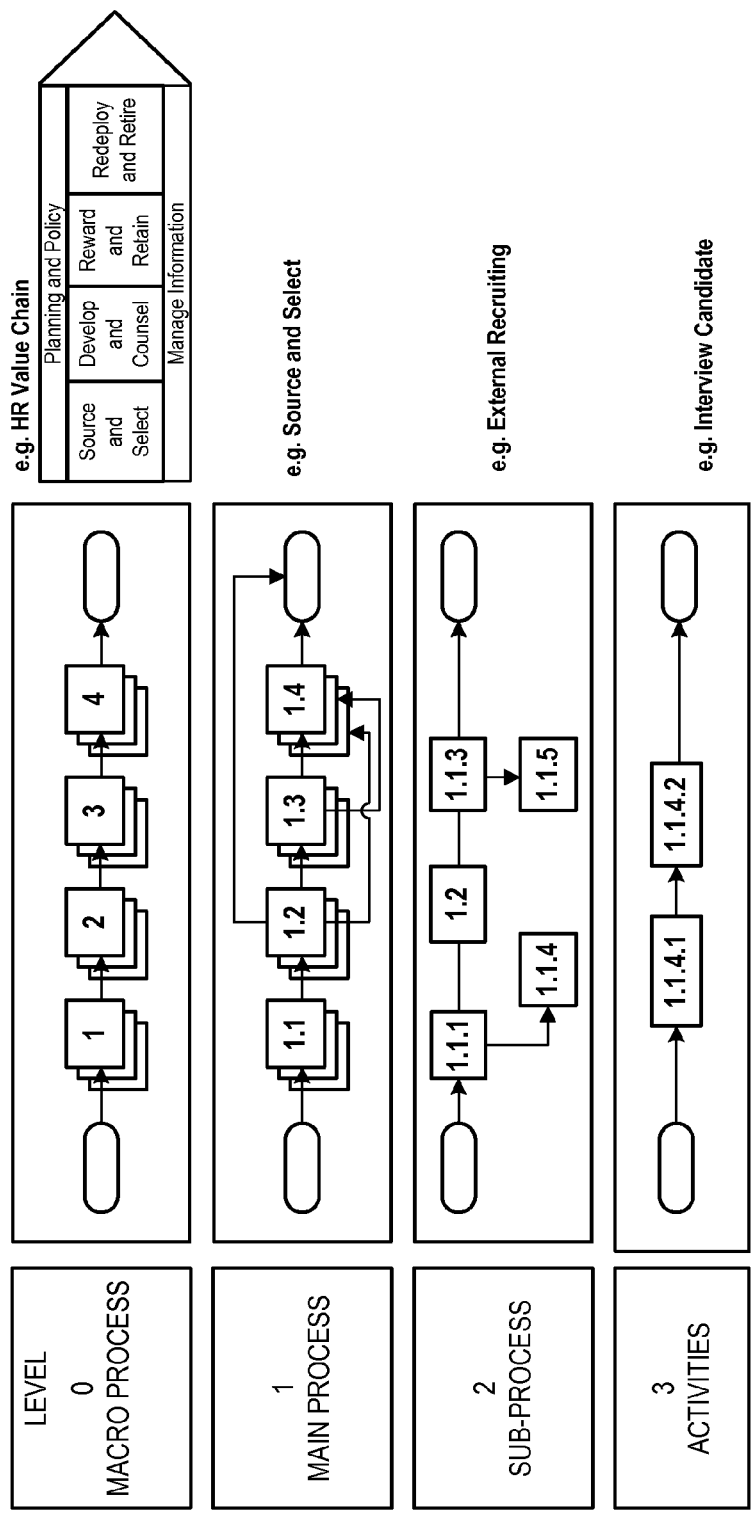

Uniform processes 202 are defined as business processes that are able to be utilized by all SSCs 102 (shown in FIG. 1) without modification. That is, uniform processes 202 are business processes that are uniform world-wide, and thus require no modification for a specific geographic, legal or cultural region that a particular SSC 102 is servicing. Examples of uniform processes 202 include recruitment and performance management in a human resource process model framework. For example, FIG. 2b shows uniform process 202a ("Recruitment") in more detail, to include the main process of sourcing and selecting candidates, the sub-process of externally recruiting candidates, and the specific activity steps of interviewing candidates. Note that the main process, sub-process and activities shown in FIG. 2b describing a uniform process 202 may also be attributable to core processes 204 and local processes 206.

Core processes 204 are defined as those business processes that are largely common across all geographic, legal and/or cultural regions, but with minor modifications. That is, core processes 204 are able to be utilized by all SSCs after a (preferably) regional modification is applied to the specific core process 204. Thus, a core process 204 such as payroll operations is essentially the same in all geographic, legal and/or cultural regions, but minor modifications must be made to the basic process (such as deducting proper taxes, paying proper overtime, etc.) to be compliant to a particular region. As noted above, core processes 204 account for the majority of the processes described by the specific processes in GPT 200.

Local processes 206 are those business processes that are able to be utilized in only a specific geographic, legal, logistic and/or cultural location or environment serviced by a specific SSC. For example, employee benefits are often unique in each European country due to different laws in different European countries. Thus, each SSC for a particular client must have local processes 206 that comply with the laws/regulations of the country, in order for that particular SSC to implement appropriate business processes for clients in that country.

The process of categorizing business processes into uniform, core or local status is basic to creating the GPT 200. Such categorization may be performed using a team of legal, business and IT experts, and ma be through the use of computer-implemented logic that correlates/defines processes to SSC-regional requirements.

Referring now to FIG. 3, a flow-chart of exemplary steps taken to create and deploy a GPT to SSCs is depicted. After initiator block 302, modules that describe uniform business processes that are to be included in the GPT are defined. Preferably, each GPT is specific to a particular broad area of a business process. For example, a GPT may be specific for Human Resources (HR), and thus includes modules describing compensation services, performance management services, employment termination services, benefits services, leader sourcing management services, HR strategy support services, top management compensation services, personnel administration services, labor/union relations services, payroll, HR reports and management reporting services, vendor sourcing and management services, organizational performance and effectiveness services, workforce scheduling and timekeeping, employee communication services, organizational administrative services, recruitment services, health and safety services, competence management services, international assignment services, training and employee development services, domestic relocation services, etc. Another GPT may be for sales, and may include billing services, telemarketing services, field marketing services, advertising services, order tracking services, etc. Alternatively, multiple business process areas may be integrated into a single GPT.

The process of categorizing business processes into uniform, core or local status is basic to creating the GPT 200. Such categorization may be performed using a team of legal, business and IT experts, and may be through the use is computer-implemented logic that correlates/defines processes to SSC-regional requirements.

As described in block 308, any modifications to core processes are then made to conform to a particular region/culture/logistic environment of a region serviced by a particular SSC. Similarly, local business processes that are unique to the particular SSC are defined, as described in block 310.

As depicted in block 312, the finished GPT is then deployed to one or more specified SSCs, and the process ends (terminator block 314).

Note that each of the business processes can thus be categorized as being exclusively a uniform process, a core process, or a local process, such that the uniform process can be used without modification by any SSC, the core process can be used with modification by the SSC, and the local process must be customized for each SSC. Furthermore, a highly detailed description of all uniform and core processes can be created to ensure standardized steps for all worldwide operations of all of the SSCs, while a less detailed description of local processes for each SSC can be created to facilitate modifications that accommodate local requirements for each client and/or SSC. Each GPT can be deployed from the SSC to a client by adapting the GPT to a specific geographic area for the client, and each GPT can be adapted to conform to local legal requirements of the client in the specific geographic area.

Figure 4:
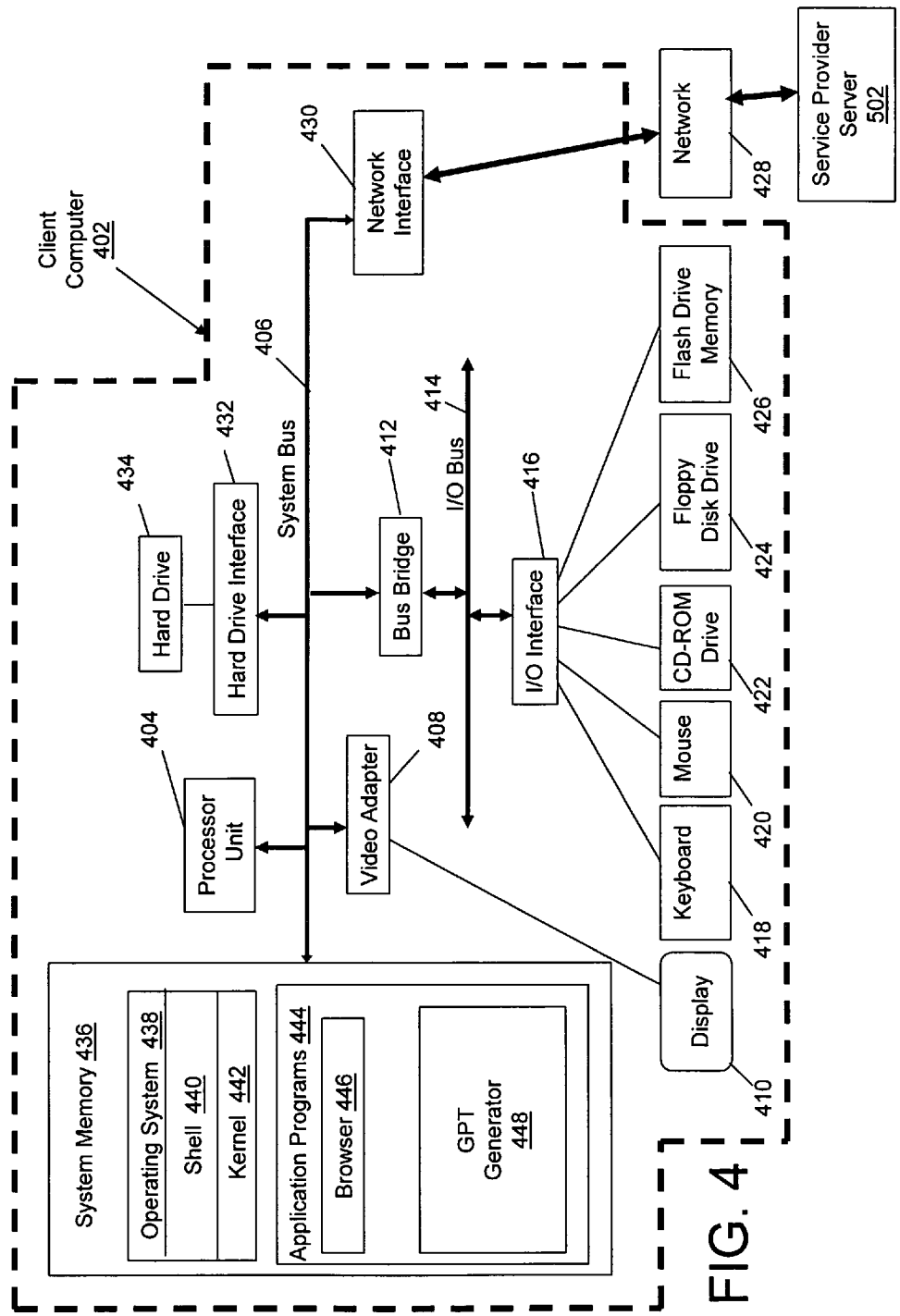
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a textbased, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Global Process Template (GPT) generator 448. GPT generator 448 includes code for implementing the processes described in FIGS. 2-3. In one embodiment, client computer 402 is able to download GPT generator 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
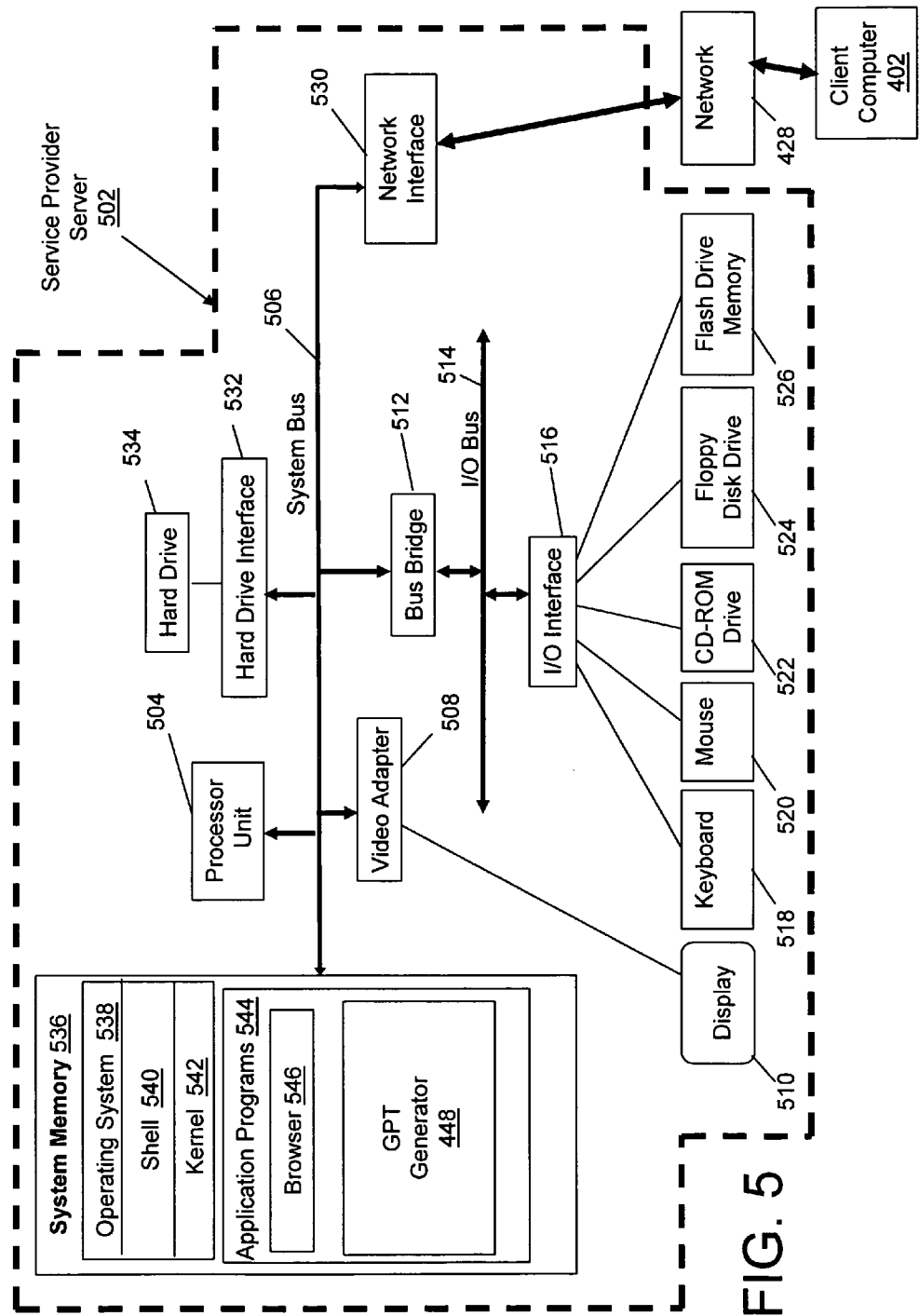
FIG. 5 illustrates an exemplary server from which software for executing the present invention may be deployed and/or implemented for the benefit of a user of the client computer shown in FIG. 4.

As noted above, GPT generator 448 can be downloaded to client computer 502 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download GPT generator 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of GPT generator 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of GPT generator 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of GPT generator 448, are performed by service provider server 502. Alternatively, GPT generator 448 and the method described herein, and in particular as shown and described in FIGS. 2-3, can be deployed as a process software from service provider server 502 to client computer 402. Still more particularly, process software for the method so described may be deployed to service provider server 502 by another service provider server (not shown).

Figure 6A:
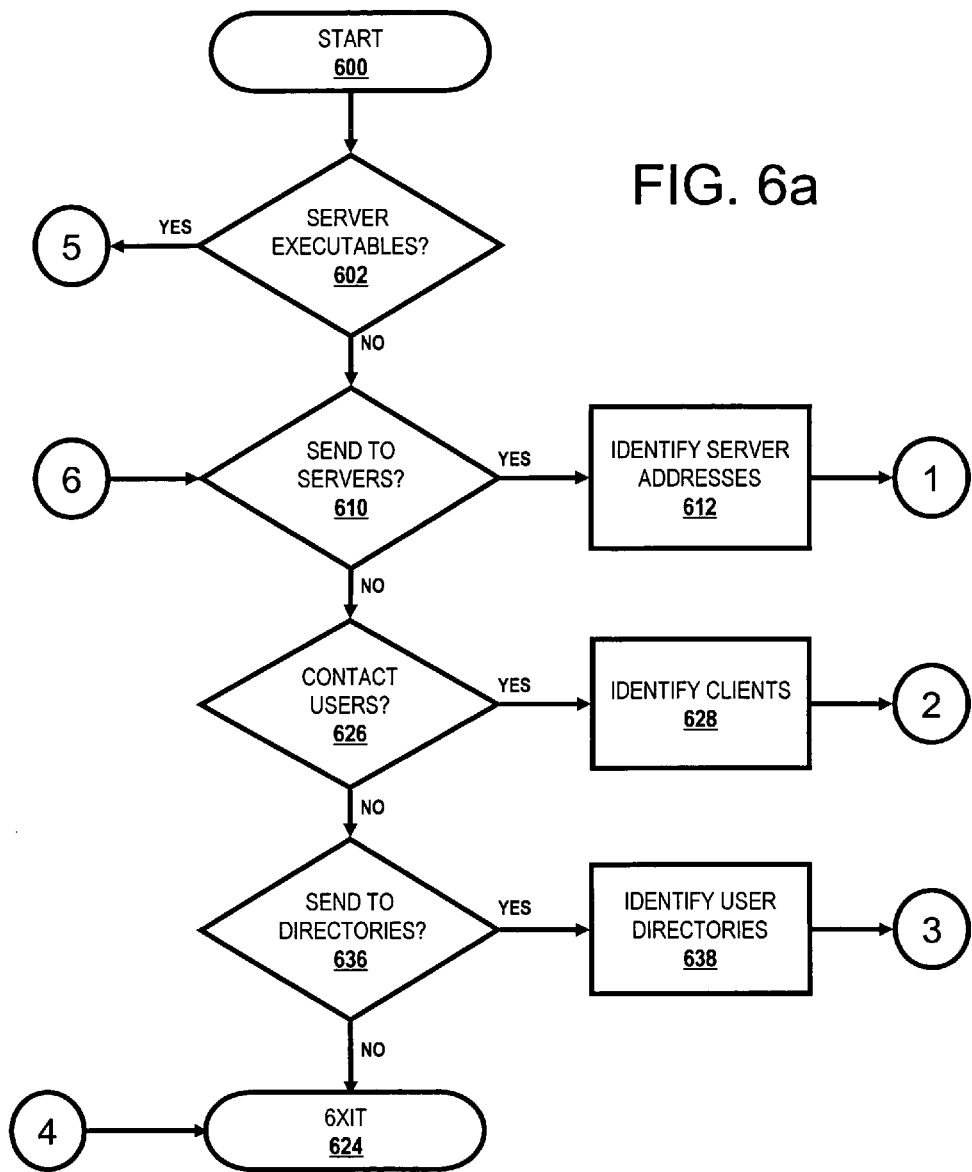

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 7A:
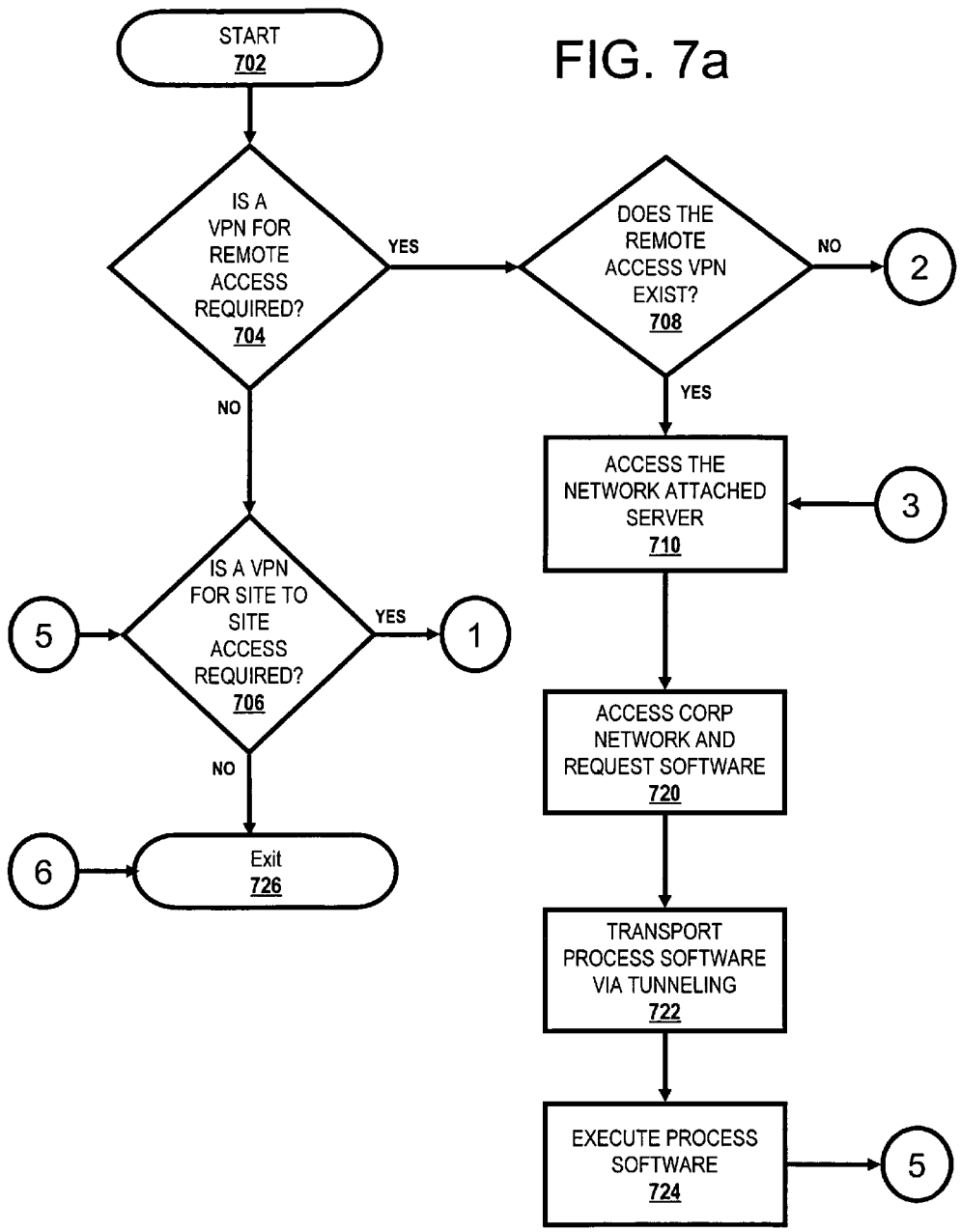
Figure 7C:
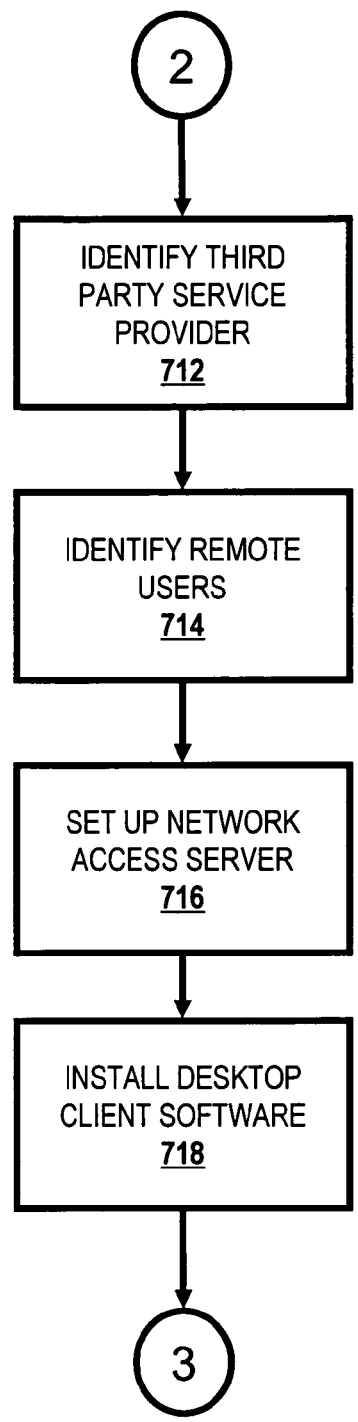

The process for such VPN deployment is described in FIG. 7. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desk-top, it is removed from the packets, reconstituted and then is executed on the remote users desk-top (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8B:
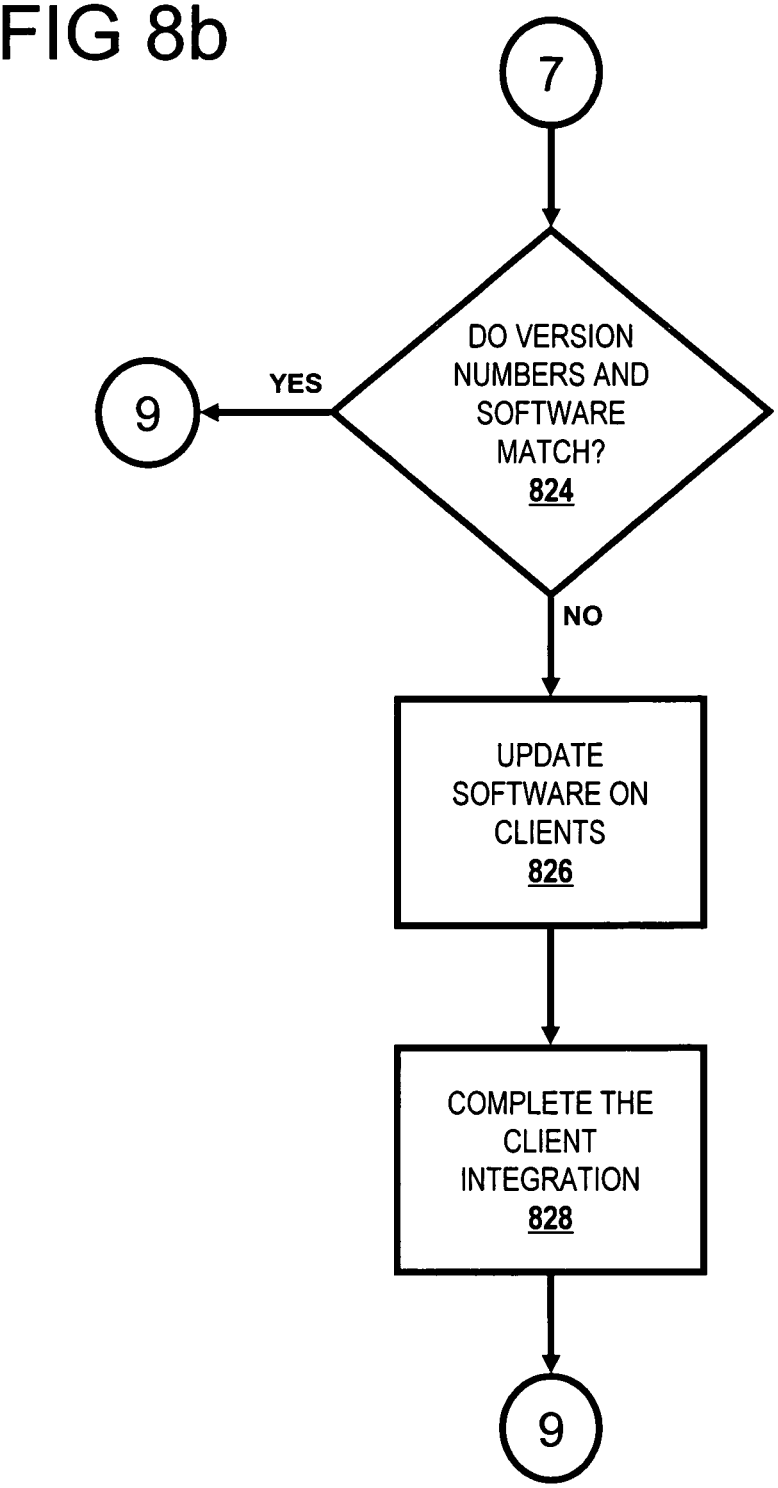

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
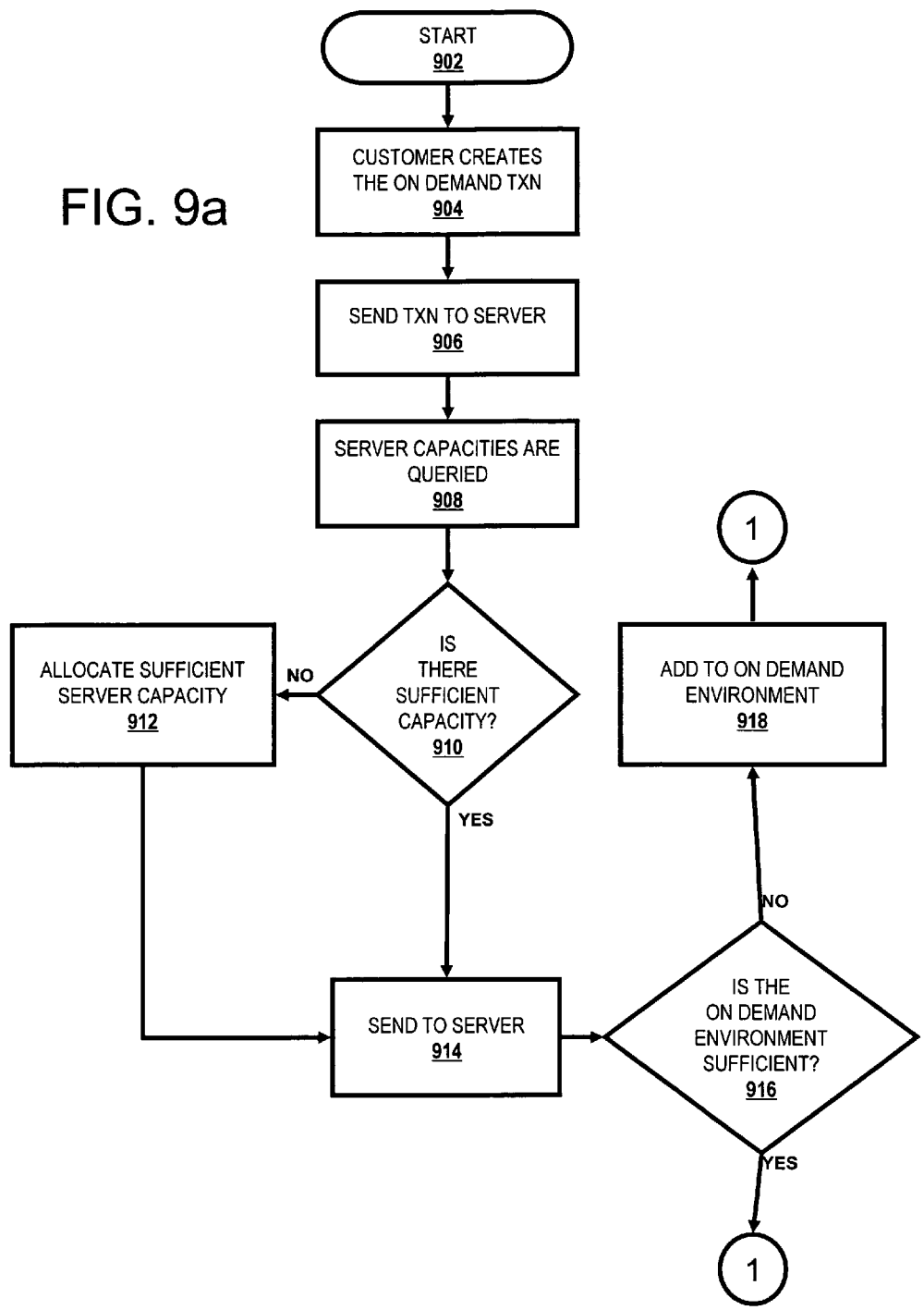
FIGS. 9a-b show a flow-chart showing steps taken to execute the steps shown and described in FIGS. 2-3 using an on-demand service provider.
Figure 9B:
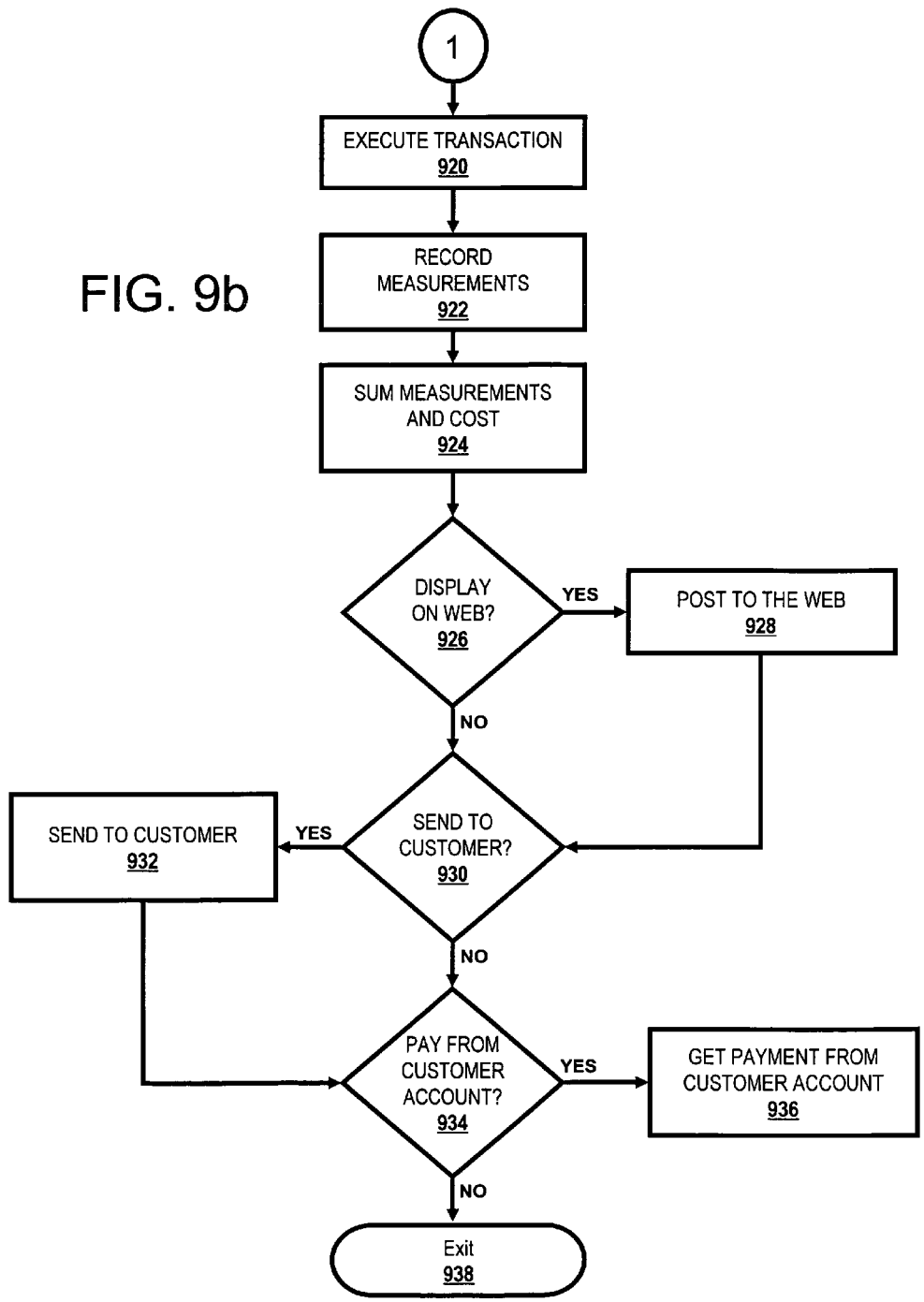

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method of standardizing business processes for a Shared Service Center (SSC), the method comprising:
a processor of a data processing device executing code, which causes the processor to perform the functions of:
creating a Global Process Template (GPT) for a specific area of a business process that is deployed to one or more SSCs of a plurality of SSCs;
selecting one or more modules to be included in the GPT, where each of the one or more modules describes a plurality of business processes;
categorizing the business processes of the selected one or more modules as one or more of uniform business processes, core business processes, and local business processes, wherein the GPT describes standardized aspects of a business process used by clients of multiple SSCs, wherein the uniform business processes are utilized without modification by all of the SSCs, wherein the local business processes are utilized in a specific geographic location serviced by a specific SSC only after being customized for the specific geographic location, and wherein the core business processes are utilized with global modifications by all of the SSCs, wherein the global modifications are the same for all worldwide geographic locations;
matching one or more legal requirements of the particular one or more SSCs with the categorized business processes;
determining whether the one or more SSCs is governed by one or more laws regarding selecting employee candidates;
in response to determining the one or more SSCs is governed by one or more laws regarding selecting employee candidates:
correlating the one or more laws with the categorized business processes; and
issuing an alert on a display of the data processing device for any process of the categorized business processes that results in an illegal operation; and
deploying the GPT to the particular one or more SSCs.

2. The method of claim 1, wherein the local business processes are utilized in at least one of a specific legal environment, a specific logistic environment, and a specific cultural environment being serviced by a specific SSC only after being customized for one or more of the specific legal environment, the specific logistic environment, and the specific cultural environment, respectively.

3. The method of claim 1, further comprising:
enabling modification of the core business processes and the local business processes at the one or more SSCs.

4. The method of claim 1, further comprising:
performing one or more modifications to the core business processes to conform the core business processes to a particular region, culture, and logistic environment serviced by the one or more SSCs; and
defining one or more additional local business processes unique to the one or more SSCs.

5. The method of claim 1, further comprising:
categorizing each of the business processes as being one of a uniform business process, a core business process, and a local business process.

6. The method of claim 1, further comprising:
creating a detailed description of all uniform business processes and core business processes, wherein the detailed description ensures standardized steps for all worldwide operations of all of the plurality of SSCs; and creating a less detailed description of all local business processes for each SSC of the plurality of SSCs to facilitate modifications that accommodate one or more local requirements of each client.

7. The method of claim 1, further comprising:
adapting the GPT to a geographic area of a particular client; and
adapting the GPT to conform to local legal requirements in the geographic area; and
overlapping a particular business process across two or more of the uniform business processes, the core business processes, and the local business processes categories;
wherein the core business processes account for a majority of the processes described by the GPT.

8. A system comprising:
a processor;
a memory coupled to the processor; and
a non-transitory computer-usable medium embodying computer program code, the computer program code comprising instructions executable by the processor and which configures the processor to:
create a Global Process Template (GPT) for an area of a business process that is deployed to one or more Shared Service Centers (SSCs) from a plurality of SSCs;
select one or more modules to include in the GPT, where each of the one or more modules describes a plurality of business processes;
categorize the business processes of the selected one or more modules as one or more of uniform business processes, core business processes, and local business processes, wherein the GPT describes standardized aspects of a business process used by clients of multiple SSCs, wherein the uniform business processes are utilized without modification by all of the SSCs, wherein the local business processes are utilized in a geographic location serviced by a specific SSC only after being customized for the geographic location, and wherein the core business processes are utilized with global modifications by all of the SSCs, wherein the global modifications are the same for all worldwide geographic locations;
match one or more legal requirements of the one or more SSCs with the categorized business processes;
determine whether the one or more SSCs is governed by one or more laws regarding selecting employee candidates;
in response to determining the one or more SSCs is governed by one or more laws regarding selecting employee candidates:
correlate the one or more laws with the categorized business processes; and
issue an alert on a display of the data processing device for any process of the categorized business processes that results in an illegal operation; and
deploy the GPT to the one or more SSCs.

9. The system of claim 8, wherein the instructions further configure the processor to:
enable modification of the core business processes and the local business processes at the one or more SSCs;
create a detailed description of all uniform business processes and core business processes, wherein the detailed description ensures standardized steps for all worldwide operations of all of the plurality of SSCs;
create a less detailed description of all local business processes for each SSC of the plurality of SSCs to facilitate modifications that accommodate one or more local requirements of each client;
categorize one or more processes into one of the three categories via utilization of a matching function that matches legal and other requirements to steps described within a module;
allow a particular business process to overlap across two or more of the uniform business processes, the core business processes, and the local business processes categories;
adapt the GPT to a geographic area of a particular client;
adapt the GPT to conform to local legal requirements in the geographic area;
perform one or more modifications to the core business processes to conform the core business processes to a particular region, culture, and logistic environment serviced by the one or more SSCs; and
wherein the core business processes account for a majority of the processes described by the GPT; and
wherein the local business processes are utilized in at least one of a specific legal environment, a specific logistic environment, and a specific cultural environment being serviced by a specific SSC only after being customized for the at least one of the specific legal environment, the specific logistic environment, and the specific cultural environment, respectively.

10. A non-transitory computer-usable storage medium embodying computer program code, the computer program code comprising computer executable instructions that when executed by a processor configures the processor to:
create a Global Process Template (GPT) for a specific area of a business process that is deployed to one or more SSCs of a plurality of SSCs;
select one or more modules to include in the GPT, where each of the one or more modules describes a plurality of business processes;
categorize the business processes of the selected one or more modules as one or more of uniform business processes, core business processes, and local business processes, wherein the GPT describes standardized aspects of a business process used by clients of multiple SSCs, wherein the uniform business processes are utilized without modification by all of the SSCs, wherein the local business processes are utilized in a geographic location serviced by a specific SSC only after being customized for the geographic location, and wherein the core business processes are utilized with global modifications by all of the SSCs, wherein the global modifications are the same for all worldwide geographic locations;
match one or more legal requirements of the one or more SSCs with the categorized business processes;
determine whether the one or more SSCs is governed by one or more laws regarding selecting employee candidates;
in response to determining the one or more SSCs is governed by one or more laws regarding selecting employee candidates:
correlate the one or more laws with the categorized business processes; and
issue an alert on a display of the data processing device for any process of the categorized business processes that results in an illegal operation; and
deploy the GPT to the one or more SSCs.

11. The non-transitory computer-usable storage medium of claim 10, wherein the embodied computer program code further comprises computer executable instructions which configures the processor to:
- enable modification of the core business processes and the local business processes at the one or more SSCs;
- create a detailed description of all uniform business processes and core business processes, wherein the detailed description ensures standardized steps for all worldwide operations of all of the plurality of SSCs;
- create a less detailed description of all local business processes for each SSC of the plurality of SSCs to facilitate modifications that accommodate one or more local requirements of each client; and
- allow a particular business process to overlap across two or more of the uniform business processes, the core business processes, and the local business processes categories.

12. The non-transitory computer-usable storage medium of claim 11, wherein the computer executable instructions are deployable to a client computer from a server at a remote location.

13. The non-transitory computer-usable storage medium of claim 11, wherein the computer executable instructions are provided by a service provider to a customer on an on-demand basis.

14. The non-transitory computer-usable storage medium of claim 10, wherein the embodied computer program code further comprises computer executable instructions which configures the processor to:
- adapt the GPT to a geographic area of a particular client;
- adapt the GPT to conform to local legal requirements in the geographic area;
- perform one or more modifications to the core business processes to conform the core business processes to a particular region, culture, and logistic environment serviced by the one or more SSCs;
- wherein the core business processes account for a majority of the processes described by the GPT;
- wherein the local business processes are able to be utilized in one or more of a specific legal environment, a specific logistic environment, and a specific cultural environment being serviced by a specific SSC only after being customized for the one or more of the specific legal environment, the specific logistic environment, and the specific cultural environment, respectively.

15. The method of claim 1, wherein the one or more laws regarding selecting employee candidates comprise one or more laws regarding selecting employee candidates on the basis of age.

16. The method of claim 1, wherein the one or more laws regarding selecting employee candidates comprise one or more laws regarding selecting employee candidates on the basis of one or more of a particular race, a particular sex, and a particular religion.

17. The method of claim 1, further comprising:
- modifying a first core business process of the categorized core business processes to be compliant with one or more payroll requirements of a region serviced by the one or more SSCs;
- modifying a second core business process of the categorized core business processes to be compliant with one or more tax deduction requirements of the region serviced by the one or more SSCs; and
- modifying a third core business process of the categorized core business processes to be compliant with one or more overtime pay requirements of the region serviced by the one or more SSCs.

18. The system of claim 8, wherein the one or more laws regarding selecting employee candidates further comprise:
- one or more laws regarding selecting employee candidates on the basis of age; and
- one or more laws regarding selecting employee candidates on the basis of one or more of a particular race, a particular sex, and a particular religion.

19. The system of claim 8, wherein the instructions further configures the processor to:
- modify a first core business process of the categorized core business processes to be compliant with one or more payroll requirements of a region serviced by the one or more SSCs;
- modify a second core business process of the categorized core business processes to be compliant with one or more tax deduction requirements of the region serviced by the one or more SSCs; and
- modify a third core business process of the categorized core business processes to be compliant with one or more overtime pay requirements of the region serviced by the one or more SSCs.

20. The non-transitory computer-usable storage medium of claim 10, wherein the embodied computer program code further comprises computer executable instructions which configures the processor to:
- modify a first core business process of the categorized core business processes to be compliant with one or more payroll requirements of a region serviced by the one or more SSCs;
- modify a second core business process of the categorized core business processes to be compliant with one or more tax deduction requirements of the region serviced by the one or more SSCs; and
- modify a third core business process of the categorized core business processes to be compliant with one or more overtime pay requirements of the region serviced by the one or more SSCs;
- wherein the one or more laws regarding selecting employee candidates further comprise:
  - one or more laws regarding selecting employee candidates on the basis of age; and
  - one or more laws regarding selecting employee candidates on the basis of one or more of a particular race, a particular sex, and a particular religion.

* * * * *